(12) United States Patent
Komatsu et al.

(10) Patent No.: US 11,525,067 B2
(45) Date of Patent: *Dec. 13, 2022

(54) MODIFICATION METHOD OF SUBSTRATE SURFACE, AND COMPOSITION AND POLYMER

(71) Applicant: JSR CORPORATION, Minato-ku (JP)

(72) Inventors: Hiroyuki Komatsu, Tokyo (JP); Miki Tamada, Tokyo (JP); Hitoshi Osaki, Tokyo (JP); Tomoki Nagai, Tokyo (JP)

(73) Assignee: JSR CORPORATION, Minato-ku (JP)

( * ) Notice: Subject to any disclaimer, the term of this patent is extended or adjusted under 35 U.S.C. 154(b) by 462 days.

This patent is subject to a terminal disclaimer.

(21) Appl. No.: 16/528,151

(22) Filed: Jul. 31, 2019

(65) Prior Publication Data

US 2020/0087530 A1    Mar. 19, 2020

(30) Foreign Application Priority Data

Aug. 1, 2018 (JP) .............................. JP2018-145309

(51) Int. Cl.
*C09D 125/04* (2006.01)
*C09D 7/40* (2018.01)
*C09D 7/20* (2018.01)

(52) U.S. Cl.
CPC ............ *C09D 125/04* (2013.01); *C09D 7/20* (2018.01); *C09D 7/40* (2018.01)

(58) Field of Classification Search
CPC .. C08F 212/08; C08F 293/005; C08F 236/04; C08F 230/02; C08F 2438/03; C09D 125/10; C09D 125/04; C09D 7/40; C09D 7/20; B05D 2202/30; B05D 2202/45; B05D 2203/30

See application file for complete search history.

(56) References Cited

U.S. PATENT DOCUMENTS

| 9,574,104 B1* | 2/2017 | Kim ..................... B82Y 10/00 |
| 2009/0269606 A1* | 10/2009 | Matsumoto ......... C23C 18/1653 428/553 |
| 2015/0284606 A1* | 10/2015 | Stol ...................... C08F 297/02 525/332.8 |

FOREIGN PATENT DOCUMENTS

| JP | 2003-76036 A | 3/2003 |
| JP | 2016-25315 A | 2/2016 |

OTHER PUBLICATIONS

Fatemeh Sadat Minaye Hashemi, et al., "Self-Correcting Process for High Quality Patterning by Atomic Layer Deposition", ACS NANO, vol. 9, No. 9, 2015, pp. 8710-8717.
Ming Fang, et al., "Area-Selective Atomic Layer Deposition: Conformal Coating Subnanometer Thickness Control, and Smart Positioning", ACS NANO, vol. 9, No. 9, 2015, pp. 8651-8654.
Haeshin Lee, et al., "Mussel-Inspired Surface Chemistry for Multifunctional Coatings", Science, 318, 2007, 10 pages.
Atsushi Hozumi, et al., "Preparation of a Well-Defined Amino-Terminated Self-Assembled Monolayer and Copper Microlines on a Polyimide Substrate Covered with an Oxide Nanoskin", LANGMUIR, vol. 21, No. 18, 2005, pp. 8234-8242.
Office Action dated Jan. 18, 2022 in corresponding Japanese Patent Application No. 2018-145309 (with English Translation), 6 pages.

* cited by examiner

*Primary Examiner* — Vishal V Vasisth
(74) *Attorney, Agent, or Firm* — Oblon, McClelland, Maier & Neustadt, L.L.P.

(57) ABSTRACT

A modification method of a surface of a substrate includes: applying a composition on a surface of a metal substrate, and heating a coating film formed by the applying, wherein the composition contains: a polymer having a first structural unit that includes an aromatic ring, and a second structural unit that includes an ethylenic double bond; a thermal acid generating agent; and a solvent, wherein the polymer has a functional group capable of bonding to a metal atom in the metal substrate.

16 Claims, No Drawings

MODIFICATION METHOD OF SUBSTRATE SURFACE, AND COMPOSITION AND POLYMER

BACKGROUND OF THE INVENTION

The present application claims priority to Japanese Patent Application No. 2018-145309, filed on Aug. 1, 2018. The contents of this application are incorporated herein by reference in their entirety.

FIELD OF INVENTION

The present invention relates to a modification method of a surface of a substrate, and a composition and a polymer.

DESCRIPTION OF THE RELATED ART

Further miniaturization of semiconductor devices has been accompanied by a demand for a technique of forming a fine pattern with a level of less than 30 nm. However, it is technically difficult to form such a fine pattern by conventional methods employing lithography, due to optical factors and the like.

Accordingly, a bottom-up technique, as generally referred to, has been contemplated for forming a fine pattern. As the bottom-up technique, in addition to a method employing directed self-assembly of a polymer, a method for selectively modifying a substrate having a surface layer that includes fine regions, i.e., a method of allowing a reaction or adsorption of various agents, etc., with or to the surface of the substrate, thereby selectively imparting a function to the surface has been recently studied. The method for selectively modifying the substrate requires a material enabling easy and highly selective modification of surface regions, and various materials have been investigated for such use (see, Japanese Unexamined Patent Application, Publication No. 2016-25315; Japanese Unexamined Patent Application, Publication No. 2003-76036; ACS Nano, 9, 9, 8710, 2015; ACS Nano, 9, 9, 8651, 2015; Science, 318, 426, 2007; and Langmuir, 21, 8234, 2005).

PRIOR ART DOCUMENTS

Patent Documents

Patent Document 1: Japanese Unexamined Patent Application, Publication No. 2016-25315
Patent Document 2: Japanese Unexamined Patent Application, Publication No. 2003-76036

Nonpatent Documents

Nonpatent Document 1: ACS Nano, 9, 9, 8710, 2015
Nonpatent Document 2: ACS Nano, 9, 9, 8651, 2015
Nonpatent Document 3: Science, 318, 426, 2007
Nonpatent Document 4: Langmuir, 21, 8234, 2005

SUMMARY OF THE INVENTION

Problems to be Solved by the Invention

However, the aforementioned conventional materials are low-molecular materials and therefore have the disadvantages of: being unsuitable for application by spin coating in preexisting processes and requiring a Langmuir-Blodgett method, which is low in efficiency; and being inferior in heat resistance. Thus, it is desired to use a high-molecular material which is high in viscosity and heat resistant. On the other hand, high-molecular materials are incapable of efficiently modifying a substrate surface due to great steric hindrance. In addition, a technique of readily providing sufficient selectivity is not yet known.

The present invention was made in view of the foregoing circumstances, and an object of the invention is to provide a modification method of a surface of a substrate, and a composition and a polymer that are capable of modifying conveniently a surface of a metal substrate, with superior selectivity and high density.

Means for Solving the Problems

According to an aspect of the invention made for solving the aforementioned problems, a modification method of a surface of a substrate includes: applying a composition on a surface of a metal substrate, and heating a coating film formed by the applying, wherein the composition contains: a polymer (hereinafter, may be also referred to as "(A) polymer" or "polymer (A)") having a first structural unit (hereinafter, may be also referred to as "structural unit (I)") that includes an aromatic ring, and a second structural unit (hereinafter, may be also referred to as "structural unit (II)") that includes an ethylenic double bond; a thermal acid generating agent (hereinafter, may be also referred to as "(B) heat acid generating agent" or "heat acid generating agent (B)"); and a solvent (hereinafter, may be also referred to as "(C) solvent" or "solvent (C)"), wherein the polymer has a functional group (hereinafter, may be also referred to as "functional group (X)") capable of bonding to a metal atom in the metal substrate.

According to another aspect of the present invention made for solving the aforementioned problems, a composition for use in surface modification of a metal substrate contains: a polymer (polymer (A)) having a first structural unit (structural unit (I)) that includes an aromatic ring, and a second structural unit (structural unit (II)) that includes an ethylenic double bond; a thermal acid generating agent (heat acid generating agent (B)); and a solvent (solvent (C)), wherein the polymer has a functional group (functional group (X)) that is capable of bonding to a metal atom in the metal substrate.

According to still another aspect of the present invention made for solving the aforementioned problems, a polymer has: a structural unit that includes an aromatic ring and a structural unit that includes an ethylenic double bond, and also has a group that includes a functional group capable of bonding to a metal atom at an end of a main chain or at an end of a side chain, wherein the structural unit that includes an ethylenic double bond is represented by the following formula (2-1), the following formula (2-2) or the following formula (2-3).

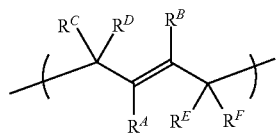

(2-1)

-continued

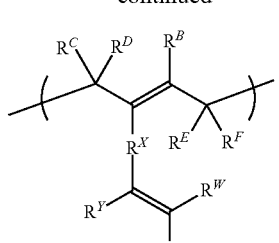

(2-2)

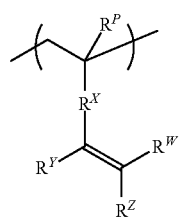

(2-3)

In the above formula (2-1), $R^A$ to $R^F$ each independently represent a hydrogen atom, a halogen atom or a monovalent organic group having 1 to 20 carbon atoms.

In the above formula (2-2), $R^B$ to $R^F$ each independently represent a hydrogen atom, a halogen atom or a monovalent organic group having 1 to 20 carbon atoms; $R^X$ represents a single bond or a divalent organic group having 1 to 20 carbon atoms; $R^Y$, $R^Z$ and $R^W$ each independently represent a hydrogen atom, a halogen atom or a monovalent organic group having 1 to 20 carbon atoms.

In the above formula (2-3), $R^P$ represents a hydrogen atom or a methyl group; $R^X$ represents a single bond or a divalent organic group having 1 to 20 carbon atoms; $R^Y$, $R^Z$ and $R^W$ each independently represent a hydrogen atom, a halogen atom or a monovalent organic group having 1 to 20 carbon atoms.

Effects of the Invention

According to the modification method of a surface of a substrate, and the composition and the polymer of the aspects of the present invention, convenient modification of the surface of the metal substrate with superior selectivity and high density is enabled. Therefore, the modification method of a surface of a substrate, and the composition and the polymer can be suitably used for working processes of semiconductor devices, and the like, in which microfabrication is expected to progress further hereafter.

DESCRIPTION OF THE EMBODIMENTS

Hereinafter, embodiments of the composition and the modification method of a surface of a substrate are explained in detail.

Composition

The composition of one embodiment of the present invention is used for surface modification of a metal substrate. The composition contains the polymer (A), the heat acid generating agent (B), and the solvent (C). The composition may also contain optional component(s) in addition to components (A) to (C), within a range not leading to impairment of the effects of the present invention.

Due to containing the components (A) to (C), the composition is capable of conveniently modifying the surface of a metal substrate, with superior selectivity and high density. Although not necessarily clarified and without wishing to be bound by any theory, the reason for achieving the effects due to the composition having the aforementioned constitution is supposed as in the following, for example. The polymer (A) has: the structural unit (I) that includes an aromatic ring; and the structural unit (II) that includes an ethylenic double bond, and also has a functional group (X) capable of bonding to a metal atom in the metal substrate. The composition enables the surface of the metal substrate to be highly selectively modified by virtue of the functional group (X). In addition, it is considered that by virtue of an action of the acid generated from the heat acid generating agent (B) through heating, the aromatic ring and the ethylenic double bond contained in the polymer (A) are crosslinked and/or cyclized by a Friedel-Crafts reaction, thereby increasing the density of the modification. Thus, according to the composition of the embodiment of the present invention, the surface of the metal substrate can be conveniently modified with superior selectivity and high density by applying the same followed by heating.

Hereinafter, each component will be described.

(A) Polymer

The polymer (A) has the structural unit (I) and the structural unit (II), and also has the functional group (X). The polymer (A) may have other structural unit(s) than the structural units (I) and (II). The structural units (I) and (II) and the functional group (X) will be described below.

Structural Unit (I)

The structural unit (I) is a structural unit that includes an aromatic ring. The "aromatic ring" as referred to means a ring belonging to the aromatic series. The aromatic ring is exemplified by a benzene ring, a condensed benzene ring, a heteroaromatic ring, and the like. The aromatic ring has ring atoms of, for example, 5 to 20, and preferably 5 to 10. The number of "ring atoms" as referred to means the number of atoms constituting the aromatic ring, and in the case of having a polycyclic ring, the number of "ring atoms" means the number of atoms constituting the polycyclic ring.

Examples of the aromatic ring include:

a benzene ring;

condensed benzene rings such as a naphthalene ring, an anthracene ring, a phenanthrene ring, a tetracene ring and a pyrene ring;

heteroaromatic rings, e.g., nitrogen atom-containing aromatic rings such as a pyrrole ring, a pyridine ring, a pyrazine ring and a quinoline ring, and oxygen atom-containing aromatic rings such as a furan ring, a pyran ring, a chromene ring and a xanthene ring;

sulfur atom-containing aromatic rings such as a thiophene ring and a benzothiophene ring; and the like.

Examples of the structural unit (I) include a structural unit represented by the following formula (1), and the like.

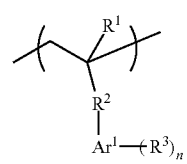

(1)

In the above formula (1), $Ar^1$ represents a group obtained by removing (n+1) hydrogen atoms on the aromatic ring from an arene having 6 to 20 ring atoms or from a heteroarene having 5 to 20 ring atoms; n is an integer of 0 to 11; $R^1$ represents a hydrogen atom or a methyl group; $R^2$ represents a single bond, —O—, —COO— or —CONH—; and $R^3$ represents a hydroxy group, a nitro group, a halogen atom or a monovalent organic group having 1 to 20 carbon atoms, wherein in a case in which n is no less than 2, a plurality of $R^3$s are identical to or different from each other.

Examples of the arene having 6 to 20 ring atoms that is capable of giving $Ar^1$ include benzene, naphthalene, anthracene, phenanthrene, tetracene, pyrene, and the like.

Examples of the heteroarene having 5 to 20 ring atoms that is capable of giving $Ar^1$ include nitrogen atom-containing aromatic heterocyclic compounds such as pyrrole, pyridine, pyrazine and quinoline;

oxygen atom-containing aromatic heterocyclic compounds such as furan, pyran, chromene and xanthene;

sulfur atom-containing aromatic heterocyclic compounds such as thiophene and benzothiophene; and the like.

$R^1$ represents preferably a hydrogen atom.

$R^2$ represents preferably a single bond or —COO—, and more preferably a single bond.

The "organic group" as referred to means a group that includes at least one carbon atom. The monovalent organic group having 1 to 20 carbon atoms which may be represented by $R^3$ is exemplified by: a monovalent hydrocarbon group having 1 to 20 carbon atoms; a group (α) that includes a divalent hetero atom-containing group between two adjacent carbon atoms of the hydrocarbon group having 1 to 20 carbon atoms; a group (β) obtained by substituting, with a monovalent hetero atom-containing group, a part or all of hydrogen atoms included in the hydrocarbon group having 1 to 20 carbon atoms or in the group (α); a group (γ) obtained by combining at least one of the hydrocarbon group having 1 to 20 carbon atoms, the group (α) and the group (β), with a divalent hetero atom-containing group; and the like.

The monovalent hydrocarbon group having 1 to 20 carbon atoms is exemplified by a monovalent chain hydrocarbon group having 1 to 20 carbon atoms, a monovalent alicyclic hydrocarbon group having 3 to 20 carbon atoms, a monovalent aromatic hydrocarbon group having 6 to 20 carbon atoms, and the like.

The "hydrocarbon group" may involve a chain hydrocarbon group, an alicyclic hydrocarbon group and an aromatic hydrocarbon group. The "hydrocarbon group" may be either a saturated hydrocarbon group or an unsaturated hydrocarbon group. The "chain hydrocarbon group" as referred to herein means a hydrocarbon group not including a ring structure but comprising only a chain structure, and both a straight chain hydrocarbon group and a branched hydrocarbon group are involved. The "alicyclic hydrocarbon group" as referred to herein means a hydrocarbon group not including an aromatic ring structure but comprising only an alicyclic structure as the ring structure, and both a monocyclic alicyclic hydrocarbon group and a polycyclic alicyclic hydrocarbon group are involved. However, the alicyclic hydrocarbon group does not need to be constituted with only the alicyclic structure, and a part thereof may include a chain structure. The "aromatic hydrocarbon group" as referred to herein means a hydrocarbon group including an aromatic ring structure as the ring structure. However, the aromatic hydrocarbon group does not need to be constituted with only the aromatic ring structure, and a part thereof may include a chain structure and/or an alicyclic structure.

Examples of the monovalent chain hydrocarbon group having 1 to 20 carbon atoms include:

alkyl groups such as a methyl group, an ethyl group, a n-propyl group and an i-propyl group;

alkenyl groups such as an ethenyl group, a propenyl group and a butenyl group;

alkynyl groups such as an ethynyl group, a propynyl group and a butynyl group; and the like.

Examples of the monovalent alicyclic hydrocarbon group having 3 to 20 carbon atoms include:

monocyclic alicyclic saturated hydrocarbon groups such as a cyclopentyl group and a cyclohexyl group;

monocyclic alicyclic unsaturated hydrocarbon groups such as a cyclopentenyl group and a cyclohexenyl group;

polycyclic alicyclic saturated hydrocarbon groups such as a norbornyl group, an adamantyl group and a tricyclodecyl group;

polycyclic alicyclic unsaturated hydrocarbon groups such as a norbornenyl group and a tricyclodecenyl group; and the like.

Examples of the monovalent aromatic hydrocarbon group having 6 to 20 carbon atoms include:

aryl groups such as a phenyl group, a tolyl group, a xylyl group, a naphthyl group and an anthryl group;

aralkyl groups such as a benzyl group, a phenethyl group, a naphthylmethyl group and an anthrylmethyl group; and the like.

The hetero atom that may constitute the monovalent or divalent hetero atom-containing group is exemplified by an oxygen atom, a nitrogen atom, a sulfur atom, a phosphorus atom, a silicon atom, a halogen atom, and the like. Examples of the halogen atom include a fluorine atom, a chlorine atom, a bromine atom, an iodine atom, and the like.

Examples of the divalent hetero atom-containing group include —O—, —CO—, —S—, —CS—, —NR'—, groups obtained by combining at least two of the same, and the like, wherein R' represents a hydrogen atom or a monovalent hydrocarbon group.

Examples of the monovalent hetero atom-containing group include a halogen atom, a hydroxy group, a carboxy group, a cyano group, an amino group, a sulfanyl group, and the like.

$R^3$ represents preferably an organic group, more preferably a substituted or unsubstituted hydrocarbon group, and still more preferably a substituted or unsubstituted chain hydrocarbon group or a substituted or unsubstituted alicyclic hydrocarbon group. Examples of the substituent for the hydrocarbon group in $R^3$ include alkoxy groups such as a methoxy group and an ethoxy group; halogen atoms such as a fluorine atom, a chlorine atom, a bromine atom and an iodine atom; and the like.

Examples of a monomer that gives the structural unit (I) include:

styrene;

substituted styrenes such as α-methylstyrene, o-methylstyrene, m-methylstyrene, p-methylstyrene, p-t-butylstyrene, 2,4,6-trimethylstyrene, p-methoxystyrene, p-t-butoxystyrene, o-vinylstyrene, m-vinylstyrene, p-vinylstyrene, o-hydroxystyrene, m-hydroxystyrene, p-hydroxystyrene, m-chloromethylstyrene, p-chloromethylstyrene, p-chlorostyrene, p-bromostyrene, p-iodostyrene, p-nitrostyrene and p-cyanostyrene;

aromatic ring-containing (meth)acrylates such as phenyl (meth)acrylate and naphthyl (meth)acrylate; and the like.

The structural unit (I) is preferably a structural unit derived from substituted or unsubstituted styrene, and more preferably a structural unit derived from unsubstituted styrene.

The lower limit of the proportion of the structural unit (I) contained with respect to the total structural units constituting the polymer (A) is preferably 10 mol %, more preferably 40 mol %, still more preferably 60 mol %, and particularly preferably 80 mol %. The upper limit of the proportion of the structural unit (I) is preferably 99 mol %, more preferably 95 mol %, and still more preferably 92 mol %. When the proportion of the structural unit (I) falls within the above range, modification with higher density is enabled.

Structural unit (II) The structural unit (II) is a structural unit that includes an ethylenic double bond (except for those corresponding to the structural unit (I)). The "ethylenic double bond" as referred to means a double bond between adjacent carbon atoms, and does not involve an aromatic conjugated double bond between adjacent carbon atoms constituting the aromatic ring.

The structural unit (II) may have one ethylenic double bond, or may have two or more ethylenic double bonds.

In the structural unit (II), the ethylenic double bond may be included in the main chain, in the side chain thereof, or in both the main chain and the side chain of the polymer (A). Of these, it is preferred for the ethylenic double bond to be included in both the main chain and the side chain, in light of increased promotion of crosslinking and/or cyclization in heating the polymer (A) to allow for modification with higher density.

Examples of the structure that includes an ethylenic double bond include:

isolated double bond structures such as an ethylene structure and a propylene structure;

conjugated double bond structures such as a butadiene structure and a hexatriene structure;

carbonyl group-conjugated double bond structures such as an acryl structure and a methacryl structure; and the like.

Examples of the structural unit (II) include structural units represented by the following formulae (2-1) to (2-3) (hereinafter, may be also referred to as "structural units (II-1) to (II-3)"), and the like.

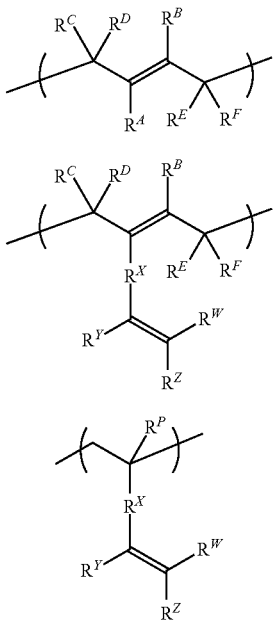

In the above formula (2-1), $R^A$ to $R^F$ each independently represent a hydrogen atom, a halogen atom or a monovalent organic group having 1 to 20 carbon atoms.

In the above formula (2-2), $R^B$ to $R^F$ each independently represent a hydrogen atom, a halogen atom or a monovalent organic group having 1 to 20 carbon atoms; $R^X$ represents a single bond or a divalent organic group having 1 to 20 carbon atoms; and $R^Y$, $R^Z$ and $R^W$ each independently represent a hydrogen atom, a halogen atom or a monovalent organic group having 1 to 20 carbon atoms.

In the above formula (2-3), $R^P$ represents a hydrogen atom or a methyl group; $R^X$ represents a single bond or a divalent organic group having 1 to 20 carbon atoms; and $R^Y$, $R^Z$ and $R^W$ each independently represent a hydrogen atom, a halogen atom or a monovalent organic group having 1 to 20 carbon atoms.

The structural unit (II-1) includes the ethylenic double bond in a main chain thereof. The structural unit (II-2) includes the ethylenic double bond in both the main chain and the side chain thereof. The structural unit (II-3) includes the ethylenic double bond in the side chain thereof.

Examples of the monovalent organic group having 1 to 20 carbon atoms which may be represented by $R^A$ to $R^F$ and $R^Y$, $R^Z$ and $R^W$ include groups similar to the monovalent organic group exemplified for $R^3$ in the above formula (1), and the like.

$R^A$ and $R^B$ each represent preferably a hydrogen atom or a monovalent organic group. $R^C$ to $R^F$ each represent preferably a hydrogen atom.

Examples of the divalent organic group having 1 to 20 carbon atoms which may be represented by $R^X$ include groups obtained by removing one hydrogen atom from the monovalent organic group exemplified for $R^3$ in the above formula (1), and the like.

$R^X$ represents preferably the divalent hydrocarbon group, more preferably an alkanediyl group, and still more preferably a methanediyl group.

$R^Y$ represents preferably a hydrogen atom. $R^Z$ and $R^W$ each represent preferably a monovalent hydrocarbon group, more preferably an alkyl group, and still more preferably a methyl group.

$R^P$ represents preferably a hydrogen atom.

Examples of the monomer that gives the structural unit (II-1) include compounds having a conjugated double bond such as butadiene, isoprene, and the like.

Examples of the monomer that gives the structural unit (II-2) include compounds having a conjugated double bond and an isolated double bond such as myrcene.

Examples of the monomer that gives the structural unit (II-3) include compounds having a plurality of isolated double bonds such as 1,5-hexadiene, and the like.

The lower limit of the proportion of the structural unit (II) contained with respect to the total structural units constituting the polymer (A) is preferably 0.1 mol %, more preferably 1 mol %, still more preferably 5 mol %, and particularly preferably 8 mol %. The upper limit of the proportion of the structural unit (II) is preferably 90 mol %, more preferably 50 mol %, still more preferably 30 mol %, and particularly preferably 20 mol %. When the proportion of the structural unit (II) falls within the above range, the degree of insolubilization of the polymer (A) in heating can be further increased.

The polymer (A) may have the structural unit (I) and the structural unit (II) in a block-wise arrangement or in a random arrangement, and in light of a further increase in the degree of insolubilization in heating the polymer (A), the structural unit (I) and the structural unit (II) are preferably included in a random arrangement.

Other Structural Units

The other structural unit is, for example, a structural unit other than the structural unit (I) and the structural unit (II), and is exemplified by a structural unit derived from a (meth)acrylic acid ester, a structural unit derived from substituted or unsubstituted ethylene, and the like.

Examples of the (meth)acrylic acid ester include:

(meth)acrylic acid alkyl esters such as methyl (meth)acrylate, ethyl (meth)acrylate, t-butyl (meth)acrylate and 2-ethylhexyl (meth)acrylate;

(meth)acrylic acid cycloalkyl esters such as cyclopentyl (meth)acrylate, cyclohexyl (meth)acrylate, 1-methylcyclopentyl (meth)acrylate, 2-ethyladamantyl (meth)acrylate and 2-(adamantan-1-yl)propyl (meth)acrylate;

(meth)acrylic acid-substituted alkyl esters such as 2-hydroxyethyl (meth)acrylate, 3-hydroxyadamantyl (meth)acrylate, 3-glycidylpropyl (meth)acrylate and 3-trimethylsilylpropyl (meth)acrylate; and the like.

Examples of substituted ethylene include:

alkenes such as propene, butene and pentene;

vinylcycloalkanes such as vinylcyclopentane and vinylcyclohexane;

cycloalkenes such as cyclopentene and cyclohexene;

vinylphosphoric acid, 4-hydroxy-1-butene, vinyl glycidyl ether, vinyl trimethyl silyl ether, and the like.

In the case in which the polymer (A) has the other structural unit, the upper limit of the proportion of the other structural unit contained with respect to the total structural units constituting the polymer (A) is preferably 30 mol %, more preferably 20 mol %, still more preferably 10 mol %, and particularly preferably 6 mol %. The lower limit of the proportion of the other structural unit is, for example, 0.1 mol %.

In the case in which the polymer (A) has the other structural unit, the other structural unit may be present in the polymer (A) in a block-wise arrangement, or may be present in a random arrangement with respect to the structural unit (I) or the structural unit (II). In the case in which the other structural unit includes the functional group (X), in light of more acceleration of bonding to the metal substrate to enable modification with higher selectivity, the other structural unit is preferably present in a block-wise arrangement.

Functional Group (X)

The functional group (X) is a functional group that is capable of bonding to a metal atom (hereinafter, may be also referred to as "metal atom (a)"). The bonding between the functional group (X) and the metal atom (a) is, for example, a chemical bond, which may be a covalent bond, an ionic bond, a coordinate bond, or the like. Of these, in light of greater strength of the bond between the metal atom (a) and the functional group (X), the coordinate bond is preferred. The metal atom (a) typically means a metal atom in the metal substrate described above.

The metal atom (a) is not particularly limited as long as it is a metal element. It is to be noted that silicon is a nonmetal and does not fall under the category of metal. Examples of the metal atom (a) include copper, iron, zinc, cobalt, aluminum, tin, tungsten, zirconium, titanium, tantalum, germanium, molybdenum, ruthenium, gold, silver, platinum, palladium, nickel, and the like. Of these, copper, cobalt, or tungsten is preferred.

The functional group (X) is exemplified by a cyano group, a phosphoric acid group, a sulfanyl group, an oxazoline ring-containing group, an epoxy group, a disulfide group, a phenolic hydroxyl group, a hydroxyboron-containing group, a carbon-carbon triple bond-containing group, and the like.

In light of further enhancement of bonding strength between the metal atom (a) and the functional group (X), the polymer (A) preferably has the group that includes the functional group (X) (hereinafter, may be also referred to as "group (I)") at the end of the main chain or at the end of the side chain.

The procedure for introducing the group (I) to the end of the main chain is exemplified by: a procedure in which a compound that includes the functional group (X) is used as, for example, an initiator of radical polymerization for synthesizing the polymer (A); a procedure in which the compound that includes the functional group (X) is used as a chain-end terminator of anionic polymerization for synthesizing the polymer (A); and the like. Examples of the initiator that includes the functional group (X) include cyano group-containing initiators such as azobisisobutyronitrile (AIBN) and the like. The chain-end terminator that includes the functional group (X) is exemplified by a boroxine compound, an epoxy group-containing halide, a carbon-carbon triple bond-containing halide, and the like.

In light of further enhancement of the bonding strength between the metal atom (a) and the functional group (X), the polymer (A) preferably has the functional group (X) at one end of the main chain.

The procedure of introducing the group (I) to the end of the side chain is exemplified by, for example, a procedure of forming a structural unit that includes the group (I) at the end of the side chain (hereinafter, may be also referred to as "structural unit (X)") by polymerizing a monomer having the functional group (X) at the end thereof. The monomer having the functional group (X) is exemplified by a vinylphosphoric acid, hydroxystyrene or a protected product thereof, an epoxy group-containing vinyl ether, and the like.

In light of further enhancement of the bonding strength between the metal atom (a) and the functional group (X), the structural unit (X) is preferably present in the polymer (A) in a block-wise arrangement, and more preferably present in a block-wise arrangement at one end of the main chain.

In light of further enhancement of the bonding strength between the metal atom (a) and the functional group (X), the lower limit of the proportion of the structural unit (X) contained with respect to the total structural units constituting the polymer (A) is preferably 0.1 mol %, more preferably 0.5 mol %, still more preferably 1 mol %, and particularly preferably 3 mol %. The upper limit of the proportion of the structural unit (X) is preferably 30 mol %, more preferably 10 mol %, and still more preferably 8 mol %.

The lower limit of the weight average molecular weight (Mw) of the polymer (A) is preferably 1,000, more preferably 2,000, still more preferably 3,000, and particularly preferably 4,000. The upper limit of the Mn is preferably 50,000, more preferably 30,000, still more preferably 10,000, and particularly preferably 7,000.

The upper limit of the ratio (Mw/Mn, dispersity index) of the weight average molecular weight (Mw) to the Mn of the polymer (A) is preferably 5, more preferably 2, still more preferably 1.5, and particularly preferably 1.3. The lower limit of the ratio is typically 1, and preferably 1.1.

The lower limit of the content of the polymer (A) with respect to the total components other than the solvent (C) in the composition of the embodiment of the present invention is preferably 80% by mass, more preferably 90% by mass, and still more preferably 95% by mass. The upper limit of the content is preferably 99% by mass, and more preferably 98% by mass.

Synthesis Procedure of Polymer (A)

The polymer (A) can be synthesized by, for example, carrying out polymerization using a monomer that gives the structural unit (I), a monomer that gives the structural unit (II), and, as needed, a monomer that gives the other structural unit, in which a compound having the functional group (X) at the end is used as the monomer that gives the other structural unit, or a compound having the functional group (X) is used as a polymerization initiator or a chain-end terminator.

In the polymerization, RAFT (Reversible Addition-Fragmentation Chain Transfer) polymerization may be carried out by using a RAFT agent, e.g., a trithiocarbonate compound such as 2-cyano-2-propyldodecyl trithiocarbonate or dibenzyl trithiocarbonate, a dithiocarbamate compound such as cyanomethyl-N-methyl-N-phenyl dithiocarbamate, a dithiobenzoate compound such as 2-cyano-2-propyl benzodithioate, a xanthate compound such as O-ethyl-S-cyanomethyl xanthogenate, or the like. Furthermore, a radical generating agent such as azobisisobutyronitrile and a thiol compound such as tert-dodecanethiol may be added to a polymer obtained by the RAFT polymerization carried out by using the RAFT agent described above, whereby a cleavage reaction is allowed at a trithiocarbonate end and thus the end of the main chain of the polymer (A) may be a hydrogen atom or the like. In this cleavage reaction, it is preferred to use a protonic solvent such as an alcohol as a proton-supplying source, in addition to the radical generating agent and the thiol compound. One example of the synthesis procedure of the polymer (A) is shown in the following reaction scheme.

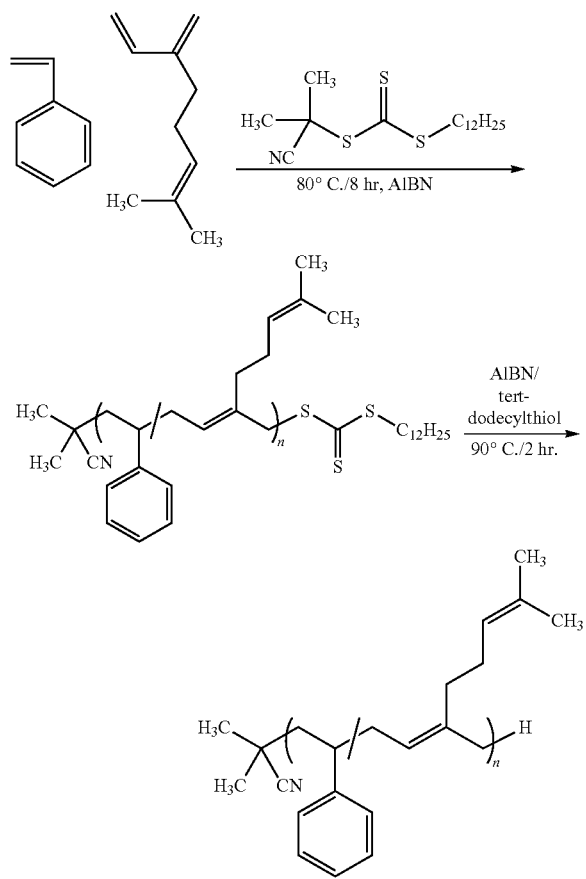

(B) Heat Acid Generating Agent

The heat acid generating agent (B) is a compound that is capable of generating an acid by heating. The heat acid generating agent (B) is exemplified by an ionic compound, a nonionic compound, and the like.

Examples of the ionic heat acid generating agent (B) include salts of:

a cation such as triphenyl sulfonium, 1-dimethylthionaphthalene, 1-dimethylthio-4-hydroxynaphthalene, 1-dimethylthio-4,7-dihydroxynaphthalene, 4-hydroxyphenyldimethyl sulfonium, benzyl-4-hydroxyphenylmethyl sulfonium, 2-methylbenzyl-4-hydroxyphenylmethyl sulfonium, 2-methylbenzyl-4-acetylphenylmethyl sulfonium, 2-methylbenzyl-4-benzoyloxyphenylmethyl sulfonium, 1-(4-n-butoxynaphthalen-1-yl) tetrahydrothiophenium, 1-(4,7-dibutoxy-1-naphthalenyl) tetrahydrothiophenium, diphenyl iodonium or di(t-butylphenyl) iodonium; with an anion e.g., a sulfonate ion which may be methanesulfonate, trifluoromethanesulfonate, a fluorinated alkyl sulfonate such as nonafluorobutane-1-sulfonate, camphorsulfonate, a p-toluenesulfonic acid ion or the like; or a phosphoric acid ion such as a hexafluorophosphoric acid ion, a boric acid ion such as a tetrafluoroboric acid ion, an antimonic acid ion such as a hexafluoroantimonic acid ion, or the like. Of these, the salts of the triphenylsulfonium cation with the fluorinated alkyl sulfonate ion are preferred, and diphenyliodonium nonafluorobutane-1-sulfonate is more preferred.

The nonionic heat acid generating agent (B) is exemplified by a halogen-containing compound, a diazomethane compound, a sulfone compound, a sulfonic acid ester compound, a carboxylic acid ester compound, a phosphoric acid ester compound, an N-sulfonyloxyimide compound, a sulfonebenzotriazole compound, and the like.

Examples of the N-sulfonyloxyimide compound include N-(trifluoromethylsulfonyloxy)succinimide, N-(2-trifluoromethylphenylsulfonyloxy)phthalimide, and the like.

The lower limit of the acid generation temperature of the heat acid generating agent (B) is preferably 80° C., more preferably 100° C., still more preferably 120° C., and particularly preferably 150° C. The upper limit of the acid generation temperature is preferably 250° C., more preferably 230° C., still more preferably 210° C., and particularly preferably 190° C. When the acid generation temperature of the heat acid generating agent (B) falls within the above range, crosslinking and/or cyclization of the polymer (A) by heating can be promoted, thereby enabling the modification with higher density. The "acid generation temperature" of the heat acid generating agent (B) may be measured in terms of a peak temperature on a maximum endothermic peak or maximum exothermic peak of a DSC curve obtained under a condition involving raising the temperature from 30° C. to 300° C. at a rate of 10° C./min, for example.

The lower limit of the content of the heat acid generating agent (B) with respect to 100 parts by mass of the polymer (A) is preferably 0.1 parts by mass, more preferably 0.5 parts by mass, still more preferably 1 part by mass, and particularly preferably 2 parts by mass. The upper limit of the content of the heat acid generating agent (B) is preferably 50 parts by mass, more preferably 30 parts by mass, still more preferably 10 parts by mass, and particularly preferably 6 parts by mass. When the content of the heat acid generating agent (B) falls within the above range, crosslinking and/or cyclization of the polymer (A) by heating can be promoted, thereby enabling the modification with higher density.

(C) Solvent

The solvent (C) is not particularly limited as long as it is a solvent capable of dissolving or dispersing at least the polymer (A) and the heat acid generating agent (B), with optional component(s) which may be contained as needed.

The solvent (C) is exemplified by an alcohol solvent, an ether solvent, a ketone solvent, an amide solvent, an ester solvent, a hydrocarbon solvent, and the like.

Examples of the alcohol solvent include:

aliphatic monohydric alcohol solvents having 1 to 18 carbon atoms such as 4-methyl-2-pentanol and n-hexanol;

alicyclic monohydric alcohol solvents having 3 to 18 carbon atoms such as cyclohexanol;

polyhydric alcohol solvents having 2 to 18 carbon atoms such as 1,2-propylene glycol;

polyhydric alcohol partially etherated solvents having 3 to 19 carbon atoms such as propylene glycol monomethyl ether; and the like.

Examples of the ether solvent include:

dialkyl ether solvents such as diethyl ether, dipropyl ether, dibutyl ether, dipentyl ether, diisoamyl ether, dihexyl ether and diheptyl ether;

cyclic ether solvents such as tetrahydrofuran and tetrahydropyran;

aromatic ring-containing ether solvents such as diphenyl ether and anisole (methyl phenyl ether); and the like.

Examples of the ketone solvent include:

chain ketone solvents such as acetone, methyl ethyl ketone, methyl n-propyl ketone, methyl n-butyl ketone, diethyl ketone, methyl iso-butyl ketone (MIBK), 2-heptanone (methyl-n-pentyl ketone), ethyl n-butyl ketone, methyl n-hexyl ketone, di-iso-butyl ketone and trimethylnonanone;

cyclic ketone solvents such as cyclopentanone, cyclohexanone, cycloheptanone, cyclooctanone and methylcyclohexanone; 2,4-pentanedione, acetonylacetone, and acetophenone; and the like.

Examples of the amide solvent include:

cyclic amide solvents such as N,N'-dimethyhmidazolidinone and N-methylpyrrolidone;

chain amide solvents such as N-methylformamide, N,N-dimethylformamide, N,N-diethylformamide, acetamide, N-methylacetamide, N,N-dimethylacetamide and N-methylpropionamide; and the like.

Examples of the ester solvent include:

acetic acid ester solvents such as ethyl acetate and n-butyl acetate;

lactic acid ester solvents such as ethyl lactate and n-butyl lactate;

polyhydric alcohol carboxylate solvents such as propylene glycol acetate;

polyhydric alcohol partially etherated carboxylate solvents such as propylene glycol monomethyl ether acetate;

lactone solvents such as γ-butyrolactone and δ-valerolactone;

polyhydric carboxylic acid diester solvents such as diethyl oxalate;

carbonate solvents such as dimethyl carbonate, diethyl carbonate, ethylene carbonate and propylene carbonate; and the like.

Examples of the hydrocarbon solvent include:

aliphatic hydrocarbon solvents having 5 to 12 carbon atoms such as n-pentane and n-hexane;

aromatic hydrocarbon solvents having 6 to 16 carbon atoms such as toluene and xylene; and the like.

Of these, the ester solvents are preferred, the polyhydric alcohol partially etherated carboxylate solvents and/or the lactic acid ester solvents are more preferred, and propylene glycol monomethyl ether acetate and/or ethyl lactate are/is still more preferred. The composition of the embodiment of the present invention may contain one, or two or more types of the solvent (C).

Optional Components

The optional components are exemplified by a surfactant and the like. When the composition of the embodiment of the present invention contains the surfactant, its coatability when applied to the surface of a substrate may be improved.

Preparation Method of Composition

The composition of the embodiment of the present invention may be prepared by, for example, mixing the polymer (A), the heat acid generating agent (B), the solvent (C), and as needed the optional component(s) at a predetermined ratio, and preferably filtering the resulting mixture through a high-density polyethylene filter, etc., having fine pores of about 0.45 μm. The lower limit of the solid content concentration of the composition is preferably 0.1% by mass, more preferably 0.5% by mass, and still more preferably 1% by mass. The upper limit of the solid content concentration is preferably 30% by mass, more preferably 10% by mass, and still more preferably 3% by mass. The "solid content concentration" as referred to herein means the concentration (% by mass) of the total components other than the solvent (C) in the composition.

Modification Method of Surface of Substrate

The modification method of a surface of a substrate (hereinafter, may be referred to simply as "surface modification method") of the embodiment of the present invention includes: a step of providing a metal substrate (hereinafter, may be also referred to as "providing step"); a step of applying the composition of the embodiment of the present invention on a surface of the metal substrate (hereinafter, may be also referred to as "applying step"); and a step of heating the coating film formed by the applying step (hereinafter, may be also referred to as "heating step").

It is preferred that the surface modification method further includes, after the heating step, a step of removing with a rinse agent, portions formed on regions other than those including the metal of the substrate, of the coating film (hereinafter, may be also referred to as "removing step").

In addition, the surface modification method of the embodiment of the present invention may further include, for example, a step of bringing an alcohol, a dilute acid, a hydrogen peroxide solution, ozone or plasma into contact with the surface of the metal substrate after the removing step (hereinafter, may be also referred to as "contacting step"), a step of depositing a pattern on the surface of the metal substrate after the removing step, with a chemical vapor deposition (CVD) method or an atom layer deposition (ALD) method (hereinafter, may be also referred to as "depositing step"), a step of etching away the polymer (A) from the surface of the metal substrate after the removing step (hereinafter, may be also referred to as "etching step"), and the like.

According to this surface modification method, selective modification of the surface of the metal substrate is carried out, and the contacting step, the depositing step, the etching step and the like are further carried out to enable processing of the substrate, whereby a processing method of the substrate can be provided. Hereinafter, each step will be described.

Providing Step

In this step, the metal substrate is provided. The "metal substrate" as referred to herein means a substrate containing the metal atom (a) in the surface layer.

Examples of the metal atom (a) include atoms exemplified as the metal atom to which the functional group (X) in the composition of the embodiment of the present invention can bond, and the like.

The metal atom (a) may be included in the surface layer of the metal substrate in the form of, for example, a metal simple substance, an alloy, an electric conductive nitride, a metal oxide, a silicide, and the like.

Examples of the metal simple substance include simple substances of metals such as copper, iron, cobalt, tungsten and tantalum, and the like.

Examples of the alloy include a nickel-copper alloy, a cobalt-nickel alloy, a gold-silver alloy, and the like.

Examples of the electric conductive nitride include tantalum nitride, titanium nitride, iron nitride, aluminum nitride, and the like.

Examples of the metal oxide include tantalum oxide, aluminum oxide, iron oxide, copper oxide, and the like.

Examples of the silicide include iron silicide, molybdenum silicide, and the like.

Of these, the metal simple substance, the alloy, the electric conductive nitride or the silicide is preferred, the metal simple substance or the electric conductive nitride is more preferred, and a copper simple substance, cobalt simple substance or tungsten simple substance is still more preferred.

The surface layer of the metal substrate has: a region (I) that preferably includes the metal atom (a); and a region (II) that does not include the metal atom (a) and preferably consists of substantially only a nonmetal atom (b).

The nonmetal atom (b) may be included in the region (II) in the form of, for example, a nonmetal simple substance, a nonmetal oxide, a nonmetal nitride, a nonmetal oxidenitride, and the like.

Examples of the nonmetal simple substance include simple substances of silicon, carbon, and the like.

The shape of the metal substrate is not particularly limited, and may be made into a desired shape such as a plate shape as appropriate.

Applying Step

In this step, the composition of the embodiment of the present invention is applied on the surface of the metal substrate.

The application procedure of the composition is exemplified by a spin-coating method, and the like.

Heating Step

In this step, the coating film formed by the applying step is heated. Accordingly, formation of the bond between the metal atom (a) in the surface layer of the metal substrate and the functional group (X) of the polymer (A) in the composition is accelerated. In addition, the heating allows a Friedel-Crafts reaction of the aromatic ring in the structural unit (I) with the ethylenic double bond in the structural unit (II) by way of an action of an acid generated from the heat acid generating agent (B), thereby allowing the crosslinking and/or cyclization to be promoted in the polymer (A). One example of the crosslinking and/or cyclization is shown by the following reaction scheme. In this example, cyclization occurs by the Friedel-Crafts reaction of the ethylenic double bond in the main chain or side chain with the aromatic ring in the side chain, both included in a single polymer (A) molecule. Additionally or alternatively, crosslinking occurs between/among polymer (A) molecules by the Friedel-Crafts reaction of the ethylenic double bond included in the main chain or side chain of one polymer (A) molecule with the aromatic ring in the side chain included in another polymer (A) molecule. As a result of such crosslinking and/or cyclization, lamination of the coating film that includes the polymer (A) (hereinafter, may be also referred to as "coating film (I)") is executed on the region (I) of the surface layer of the metal substrate.

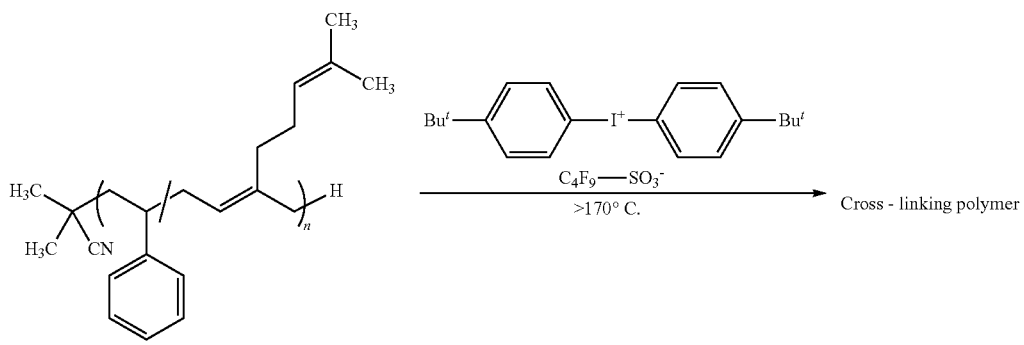

Examples of the nonmetal oxide include silicon oxide, and the like.

Examples of the nonmetal nitride include SiNx, $Si_3N_4$, and the like.

Examples of the nonmetal oxidenitride include SiON, and the like.

Of these, the nonmetal oxide is preferred, and the silicon oxide is more preferred.

A mode of the arrangement of the region (I) and the region (II) on the surface layer of the metal substrate is not particularly limited, and is exemplified by surficial, spotted, striped, and other shapes in a planar view. The sizes of the region (I) and the region (II) are not particularly limited, and regions having a desired size may be provided as appropriate.

Means for the heating may be, for example, an oven, a hot plate, or the like. The heating temperature may be appropriately selected depending on the acid generation temperature, etc., of the heat acid generating agent (B) in the composition. The lower limit of the temperature of the heating is preferably 80° C., more preferably 100° C., still more preferably 130° C., and particularly preferably 150° C. The upper limit of the temperature of the heating is preferably 400° C., more preferably 300° C., still more preferably 200° C., and particularly preferably 180° C. The lower limit of the time period of the heating is preferably 10 sec, more preferably 60 sec, still more preferably 120 sec, and particularly preferably 300 sec. The upper limit of the time period of the heating is preferably 120 min, more preferably 60 min, still more preferably 1,200 sec, and particularly preferably 600 sec.

The heating may be carried out through one step or through multiple (two or more) steps. When the heating is carried out through two steps, formation of the bond between the metal atom (a) and the functional group (X) can be more accelerated in the first step, whereas crosslinking and/or cyclization of the polymer (A) can be more promoted in the second step, thereby enabling the modification with higher density.

The average thickness of the coating film (I) formed may be adjusted to a desired value through appropriately selecting the type and concentration of the polymer (A) in the composition, and conditions in the heating step such as the heating temperature and the heating time period. The lower limit of the average thickness of the coating film (I) is preferably 0.1 nm, more preferably 1 nm, and still more preferably 3 nm. The upper limit of the average thickness is, for example, 20 nm.

Removing Step

In this step, a portion formed on the region (II) of the coating film (I) is removed with a rinse agent. Accordingly, a portion that includes the polymer (A) not bonded to the metal atom (a) after the heating step is removed, whereby a metal substrate having a portion of the region (I) being selectively modified is obtained.

The removing in the removing step is carried out typically by rinsing the metal substrate after the heating step with a rinse agent. The rinse agent used is typically an organic solvent, and for example, a polyhydric alcohol partially etherated carboxylate solvent such as propylene glycol monomethyl ether acetate, a monohydric alcohol solvent such as isopropanol, or the like may be used.

In the aforementioned manner, convenient modification of the metal substrate with superior selectivity and high density is enabled. The metal substrate thus obtained may be variously processed by carrying out, for example, the following step(s).

Contacting Step

In this step, an alcohol, a dilute acid, a hydrogen peroxide solution, ozone or plasma is brought into contact with the surface of the metal substrate after the removing step. Accordingly, an air-oxidized film layer formed on the region (II) can be removed. The dilute acid is not particularly limited, and examples of the dilute acid include dilute hydrochloric acid, dilute sulfuric acid, dilute nitric acid, dilute citric acid, dilute oxalic acid, dilute maleic acid, dilute acetic acid, dilute isobutyric acid, dilute 2-ethylhexanoic acid, and the like.

Depositing Step

In this step, a pattern is deposited on the surface of the metal substrate by the CVD method or the ALD method after the removing step. Thus, the pattern can be formed selectively on the region (II) not covered by the polymer (A). Examples of the CVD method include a variety of methods such as thermal CVD, plasma CVD, photo-assisted CVD, low-pressure CVD, laser CVD and organic metal CVD (MOCVD). Examples of the ALD method include a thermal ALD method, a plasma ALD method, and the like.

Etching Step

In this step, the polymer (A) on the surface of the metal substrate after the removing step is removed by etching.

The etching procedure is exemplified by well-known techniques including: reactive ion etching (RIE) such as chemical dry etching carried out using $CF_4$, an $O_2$ gas or the like by utilizing the difference in etching rate of each layer, etc., as well as chemical wet etching (wet development) carried out by using an etching liquid, e.g., an organic solvent, as well as an aqueous solution of an acid such as hydrofluoric acid, acetic acid or citric acid, an alkali such as ammonia, or hydrogen peroxide, or a combination thereof; and physical etching such as sputter etching, ion beam etching, and a gas treatment with $N_2$, $H_2$, $O_2$, etc. Of these, the reactive ion etching is preferred, and the chemical dry etching or the chemical wet etching is more preferred.

Prior to the chemical dry etching, an irradiation with a radioactive ray may be also carried out as needed. As the radioactive ray, when the portion to be removed by etching is a polymer that includes a methyl polymethacrylate block, irradiation with UV or the like may be used. Alternatively, an oxygen plasma treatment may be used. The irradiation with UV or the oxygen plasma treatment results in degradation of the methyl polymethacrylate block phase, thereby facilitating the etching.

Examples of the organic solvent for use in the chemical wet etching include:

alkanes such as n-pentane, n-hexane and n-heptane;

cycloalkanes such as cyclohexane, cycloheptane and cyclooctane;

saturated carboxylic acid esters such as ethyl acetate, n-butyl acetate, i-butyl acetate and methyl propionate;

ketones such as acetone, methyl ethyl ketone, methyl isobutyl ketone and methyl n-pentyl ketone;

alcohols such as methanol, ethanol, 1-propanol, 2-propanol and 4-methyl-2-pentanol; and the like. These solvents may be used either alone, or two or more types thereof may be used in combination.

EXAMPLES

Hereinafter, the present invention is explained in detail by way of Examples, but the present invention is not in any way limited to these Examples. The measuring method for each physical property is shown below.

Mw and Mn

The Mw and the Mn of the polymer were determined by gel permeation chromatography (GPC) using GPC columns (Tosoh Corporation; "G2000 HXL"×2, "G3000 HXL"×1 and "G4000 HXL"×1) under the following conditions:

eluent: tetrahydrofuran (Wako Pure Chemical Industries, Ltd.);

flow rate: 1.0 mL/min;

sample concentration: 1.0% by mass;

amount of sample injected: 100 μL;

column temperature: 40° C.;

detector: differential refractometer; and standard substance: mono-dispersed polystyrene.

Synthesis of Polymer (A)

Synthesis Example 1: Synthesis of Polymer (A-1)

Into a 200-mL three-neck flask as a reaction vessel, 0.098 g of azobisisobutyronitrile (0.6 mmol), 11.25 g of styrene (0.108 mol), 0.83 g of 2-cyano-2-propyldodecyl trithiocarbonate (0.002 mol), 1.63 g of myrcene (0.012 mol) and 20 g of anisole were charged, and the mixture was heated with stirring in a nitrogen atmosphere at 80° C. for 8 hrs.

The polymerization solution was subjected to purification by precipitation in 300 g of methanol, and the yellow viscous matter thus obtained was recovered and dissolved in 20 g of propylene glycol monomethyl ether acetate. To the solution, 0.49 g of azobisisobutyronitrile (0.003 mol) and 2.03 g of tert-dodecanethiol (0.010 mol) were added, and the mixture was refluxed at 80° C. for 2 hrs to allow for a cleavage reaction of the trithiocarbonate end. The polymerization solution thus resulting was concentrated under reduced pressure, and the concentrate was subjected to purification by precipitation in 1,000 g of methanol to give a pale yellow viscous matter. Next, the viscous matter was dried under reduced pressure at 60° C., whereby 6.5 g of a polymer (A-1) represented by the following formula (A-1) was obtained as a pale yellow solid. As determined by the method described above, the polymer (A-1) had a Mw of 4,500, a Mn of 4,000, and a Mw/Mn of 1.13.

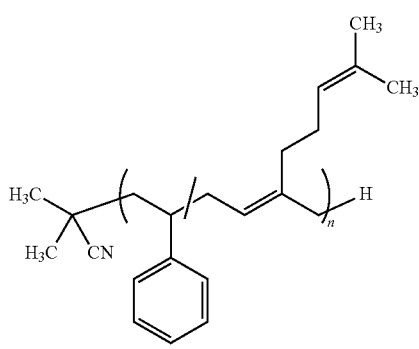

(A-1)

Synthesis Example 2: Synthesis of Polymer (A-2)

Into a 200-mL three-neck flask as a reaction vessel, 0.098 g of azobisisobutyronitrile (0.6 mmol), 10.63 g of styrene (0.102 mol), 0.58 g of dibenzyl trithiocarbonate (0.002 mol), 1.63 g of myrcene (0.012 mol) and 20 g of anisole were charged, and the mixture was heated with stirring in a nitrogen atmosphere at 80° C. for 5 hrs. Next, 0.64 g of vinylphosphoric acid (0.006 mol) was added to the mixture, which was heated with stirring at 80° C. for 3 hrs.

The polymerization solution was subjected to purification by precipitation in 300 g of methanol, and the yellow viscous matter thus obtained was recovered and dissolved in 20 g of propylene glycol monomethyl ether acetate. To the solution, 0.49 g of azobisisobutyronitrile (0.003 mol) and 2.03 g of tert-dodecanethiol (0.010 mol) were added, and the mixture was refluxed at 80° C. for 2 hrs to allow for a cleavage reaction of the trithiocarbonate end. The polymerization solution thus resulting was concentrated under reduced pressure, and the concentrate was subjected to purification by precipitation in 1,000 g of methanol to give a pale yellow viscous matter. Next, the viscous matter was dried under reduced pressure at 60° C., whereby 6.5 g of a polymer (A-2) represented by the following formula (A-2) was obtained as a pale yellow solid. The polymer (A-2) had a Mw of 4,600, a Mn of 3,800, and a Mw/Mn of 1.21.

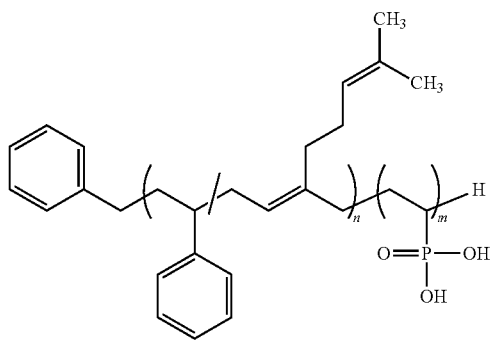

(A-2)

Synthesis Example 3: Synthesis of Polymer (A-3)

Into a 200-mL three-neck flask as a reaction vessel, 0.098 g of azobisisobutyronitrile (0.6 mmol), 10.63 g of styrene (0.102 mol), 0.58 g of dibenzyl trithiocarbonate (0.002 mol), 1.63 g of myrcene (0.012 mol) and 20 g of anisole were charged, and the mixture was heated with stirring in a nitrogen atmosphere at 80° C. for 8 hrs.

The polymerization solution was subjected to purification by precipitation in 300 g of methanol, and the yellow viscous matter thus obtained was recovered and dissolved in 20 g of propylene glycol monomethyl ether acetate. To the solution, 0.49 g of azobisisobutyronitrile (0.003 mol) and 2.03 g of tert-dodecanethiol (0.010 mol) were added, and the mixture was refluxed at 80° C. for 2 hrs to allow for a cleavage reaction of the trithiocarbonate end. The polymerization solution thus resulting was concentrated under reduced pressure, and the concentrate was subjected to purification by precipitation in 1,000 g of methanol to give a pale yellow viscous matter. Next, the viscous matter was dried under reduced pressure at 60° C., whereby 6.5 g of a polymer (A-3) represented by the following formula (A-3) was obtained as a pale yellow solid. The polymer (A-3) had a Mw of 4,600, a Mn of 3,800, and a Mw/Mn of 1.21.

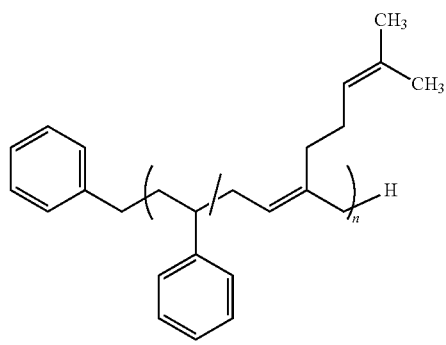

(A-3)

Preparation of Composition

Example 1

A composition (S-1) was prepared by: adding as the heat generating agent (B), 0.05 g of diphenyliodonium nonafluorobutane-1-sulfonate (heat acid generating agent (B-1); acid generation temperature=170° C.), and as the solvent (C), 74.03 g of propylene glycol monomethyl ether acetate (PGMEA) (solvent (C-1)) and 24.67 g of ethyl lactate (solvent (C-2)) to 1.25 g of (A-1) as the polymer (A); stirring the mixture; and then filtering the stirred mixture through a high-density polyethylene filter with fine pores having a pore size of 0.45 μm.

Example 2 and Comparative Examples 1 to 4

Compositions (S-2) to (S-6) were prepared similarly to Example 1 except that each type of the component in the amount shown in Table 1 below was used.

TABLE 1

| Amount (g) | | Example 1 | Example 2 | Comparative Example 1 | Comparative Example 2 | Comparative Example 3 | Comparative Example 4 |
|---|---|---|---|---|---|---|---|
| Composition | | S-1 | S-2 | S-3 | S-4 | S-5 | S-6 |
| (A) Polymer | A-1 | 1.25 | | | 1.3 | | |
| | A-2 | | 1.25 | | | 1.3 | |
| | A-3 | | | 1.25 | | | 1.3 |
| (B) Heat acid generating agent | B-1 | 0.05 | 0.05 | 0.05 | | | |
| (C) Solvent | C-1 | 74.03 | 74.03 | 74.03 | 98.7 | 98.7 | 98.7 |
| | C-2 | 24.67 | 24.67 | 24.67 | | | |
| Solid content concentration (% by mass) | | 1.30 | 1.30 | 1.30 | 1.30 | 1.30 | 1.30 |

Modification of Surface of Substrate

An eight-inch copper substrate was immersed in a 5% by mass aqueous oxalic acid solution, and then dried by a nitrogen flow to remove an oxidized coating film on the surface thereof. In the following, a cobalt substrate and a tungsten substrate were also subjected to a similar treatment. A silicon oxide substrate was also subjected to a surface treatment with isopropanol.

Next each of the compositions prepared as described above was spin-coated by using Track ("TELDSA ACT8" available from Tokyo Electron Limited) at 1,500 rpm, and baked at 150° C. for 180 sec to permit the first reaction through accelerating formation of the bond between the polymer (A) and the metal atom in the surface layer of the substrate.

Evaluations

With respect to the substrate after being subjected to the surface modification, the contact angle of the surface and the post-heating solubility of the coating film were evaluated according to the following method. The results of the evaluations are shown together in Table 2 below.

Contact Angle

The contact angle of the surface was measured by using a contact angle scale, Drop master DM-501 (Kyowa Interface Science Co., LTD.).

Solubility of Coating Film after Heating

The metal substrate coated with the composition was baked at 170° C. for 600 sec to permit the second reaction through allowing the thermal crosslinking reaction and the thermal cyclization reaction to proceed. The coating film thus obtained was scraped away and the solubility in propylene glycol monomethyl ether acetate was evaluated. The coating film being insoluble indicates that the Friedel-Craft reaction would have proceeded, whereas the coating film being soluble indicates that the Friedel-Craft reaction would not have proceeded.

TABLE 2

| Copper substrate | | | Sample SCA after 1st reaction | | SCA after 2nd reaction | | Solubility after 2nd reaction |
|---|---|---|---|---|---|---|---|
| | | | Copper | Si oxide | Copper | Si oxide | |
| | Composition | (Control) | 64 | 36 | 64 | 36 | |
| Example 1 | S-1 | a-CN-poly(St-r-myrcene) | 86 | 41 | 89 | 41 | Insoluble |
| Example 2 | S-2 | a-Bz-poly(St-r-myrcene)-block-poly(VPA) | 86 | 38 | 89 | 38 | Insoluble |
| Comparative Example 1 | S-3 | a-BZz-poly(St-r-myrcene) | 60 | 40 | 60 | 40 | Soluble |
| Comparative Example 2 | S-4 | a-CN-poly(St-r-myrcene) | 86 | 40 | 84 | 40 | Soluble |
| Comparative Example 3 | S-5 | a-Bz-poly(St-r-myrcene)-block-poly(VPA) | 86 | 41 | 85 | 41 | Soluble |
| Comparative Example 4 | S-6 | a-BZz-poly(St-r-myrcene) | 58 | 40 | 58 | 40 | Soluble |

TABLE 2-continued

| Cobalt substrate | | | Sample | | | | |
|---|---|---|---|---|---|---|---|
| | | | SCA after 1st reaction | | SCA after 2nd reaction | | |
| | | Composition | Cobalt | Si oxide | Cobalt | Si oxide | Solubility after 2nd reaction |
| | | (Control) | 64 | 36 | 64 | 36 | |
| Example 3 | S-1 | a-CN-poly(St-r-myrcene) | 86 | 40 | 90 | 41 | Insoluble |
| Example 4 | S-2 | a-Bz-poly(St-r-myrcene)-block-poly(VPA) | 86 | 38 | 90 | 38 | Insoluble |
| Comparative Example 5 | S-3 | a-BZz-poly(St-r-myrcene) | 60 | 40 | 60 | 40 | Soluble |
| Comparative Example 6 | S-4 | a-CN-poly(St-r-myrcene) | 86 | 40 | 84 | 40 | Soluble |
| Comparative Example 7 | S-5 | a-Bz-poly(St-r-myrcene)-block-poly(VPA) | 86 | 41 | 85 | 41 | Soluble |
| Comparative Example 8 | S-6 | a-BZz-poly(St-r-myrcene) | 58 | 40 | 56 | 40 | Soluble |

| Tungsten substrate | | | Sample | | | | |
|---|---|---|---|---|---|---|---|
| | | | SCA after 1st reaction | | SCA after 2nd reaction | | |
| | | composition | Tungsten | Si oxide | Tungsten | Si oxide | Solubility after 2nd reaction |
| | | (Control) | 64 | 36 | 64 | 36 | |
| Example 5 | S-1 | a-CN-poly(St-r-myrcene) | 85 | 40 | 88 | 41 | Insoluble |
| Example 6 | S-2 | a-Bz-poly(St-r-myrcene)-block-poly(VPA) | 85 | 38 | 89 | 38 | Insoluble |
| Comparative Example 9 | S-3 | a-BZz-poly(St-r-myrcene) | 58 | 40 | 58 | 40 | Soluble |
| Comparative Example 10 | S-4 | a-CN-poly(St-r-myrcene) | 86 | 40 | 84 | 40 | Soluble |
| Comparative Example 11 | S-5 | a-Bz-poly(St-r-myrcene)-block-poly(VPA) | 86 | 41 | 85 | 41 | Soluble |
| Comparative Example 12 | S-6 | a-BZz-poly(St-r-myrcene) | 58 | 40 | 56 | 40 | Soluble |

From the results shown in Table 2, it is revealed that the contact angle of the surface of the metal substrate was changed and the coating film was insolubilized by heating, according to the compositions of Examples. Therefore, the composition of the embodiment of the present invention is believed to enable convenient modification with superior selectivity and high density.

INDUSTRIAL APPLICABILITY

According to the composition, the modification method of a surface of a substrate, and the polymer of the embodiments of the present invention, convenient modification of the surface of the metal substrate with superior selectivity and high density is enabled. Therefore, the composition, the modification method of a surface of a substrate, and the polymer can be suitably used for working processes of semiconductor devices, and the like, in which microfabrication is expected to progress further hereafter.

What is claimed is:

1. A method of modifying a surface of a substrate, comprising:
    applying a composition on a surface of a metal substrate such that a coating film is formed; and
    heating the coating film,
    wherein the composition comprises:
    a polymer that comprises a first structural unit comprising an aromatic ring, and a second structural unit;
    a thermal acid generating agent; and
    a solvent,
    wherein
    the polymer comprises a functional group capable of bonding to a metal atom in the metal substrate,
    the functional group is a mercapto group, and
    the second structural unit has formula (2-2)

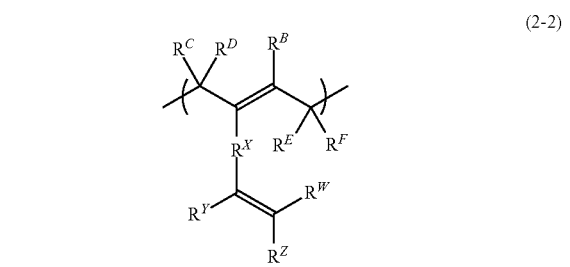

(2-2)

where $R^B$ to $R^F$ each independently are a hydrogen atom, a halogen atom or a monovalent organic group having 1 to 20 carbon atoms; $R^X$ is a single bond or a divalent organic group having 1 to 20 carbon atoms; and $R^Y$, $R^Z$ and $R^W$ each independently are a hydrogen atom, a halogen atom or a monovalent organic group having 1 to 20 carbon atoms.

2. The method according to claim 1, wherein the polymer comprises a group that comprises the functional group at an end of a main chain or at an end of a side chain.

3. The method according to claim 1, wherein the first structural unit is derived from a substituted or unsubstituted styrene.

4. The method according to claim 1, wherein a proportion of the second structural unit in the polymer is no greater than 50 mol %.

5. The method according to claim 1, wherein the second structural unit is derived from myrcene.

6. A composition, comprising:
a polymer that comprises a first structural unit comprising an aromatic ring, and a second structural unit;
a thermal acid generating agent; and
a solvent,
wherein
the polymer comprises a functional group that is capable of bonding to a metal atom in the metal substrate, the functional group is a mercapto group, and the second structural unit has formula (2-2)

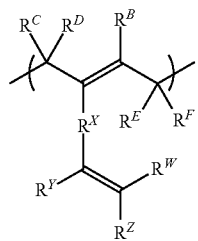

(2-2)

where $R^B$ to $R^F$ each independently are a hydrogen atom, a halogen atom or a monovalent organic group having 1 to 20 carbon atoms; $R^X$ is a single bond or a divalent organic group having 1 to 20 carbon atoms; and $R^Y$, $R^Z$ and $R^W$ each independently are a hydrogen atom, a halogen atom or a monovalent organic group having 1 to 20 carbon atoms.

7. A polymer, comprising:
a structural unit comprising an aromatic ring, and a structural unit comprising an ethylenic double bond, and
a group that comprises a functional group capable of bonding to a metal atom at an end of a main chain or at an end of a side chain, wherein the functional group is a mercapto group,
the structural unit comprising an ethylenic double bond is represented by formula (2-2):

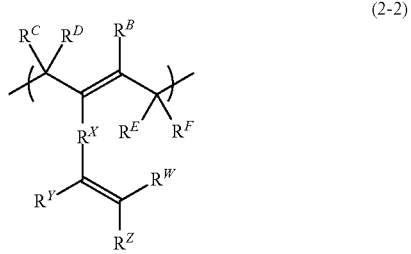

(2-2)

where $R^B$ to $R^F$ each independently represent a hydrogen atom, a halogen atom or a monovalent organic group having 1 to 20 carbon atoms; $R^X$ represents a single bond or a divalent organic group having 1 to 20 carbon atoms; and $R^Y$, $R^Z$ and $R^W$ each independently represent a hydrogen atom, a halogen atom or a monovalent organic group having 1 to 20 carbon atoms.

8. The polymer according to claim 7, wherein the structural unit of the formula (2-2) is derived from myrcene.

9. The polymer according to claim 7, wherein the structural unit comprising an aromatic ring is derived from a substituted or unsubstituted styrene.

10. The polymer according to claim 7, wherein a proportion of the structural unit of the formula (2-2) in the polymer is from 0.1 mol % to 50 mol %.

11. The polymer according to claim 7, wherein a proportion of the structural unit of the formula (2-2) in the polymer is from 8 mol % to 20 mol %.

12. The composition according to claim 6, wherein the second structural unit is derived from myrcene.

13. The composition according to claim 6, wherein the first structural unit is derived from a substituted or unsubstituted styrene.

14. The composition according to claim 6, wherein a proportion of the second structural unit in the polymer is from 0.1 mol % to 50 mol %.

15. The composition according to claim 6, wherein a proportion of the second structural unit in the polymer is from 8 mol % to 20 mol %.

16. The method according to claim 1, wherein a proportion of the second structural unit in the polymer is from 8 mol % to 20 mol %.

* * * * *